United States Patent Office 3,341,018
Patented Sept. 12, 1967

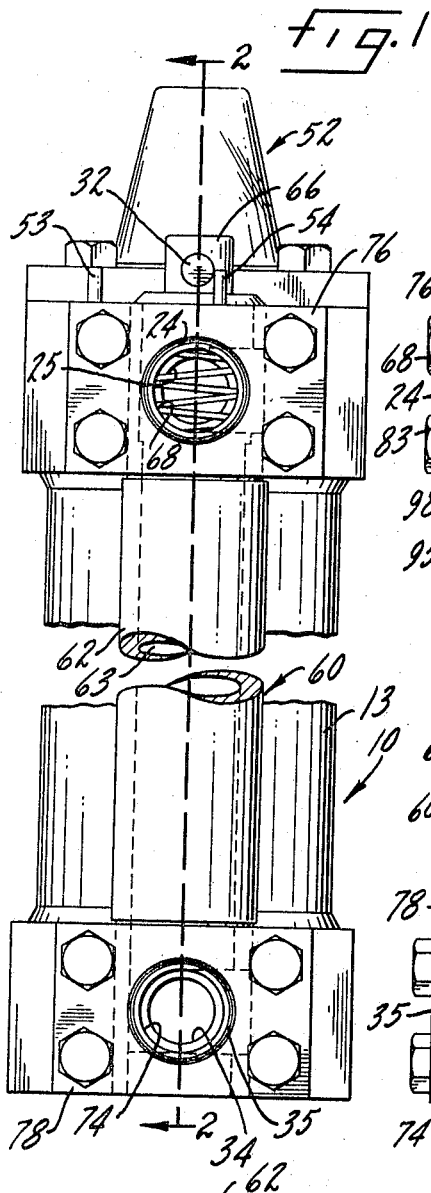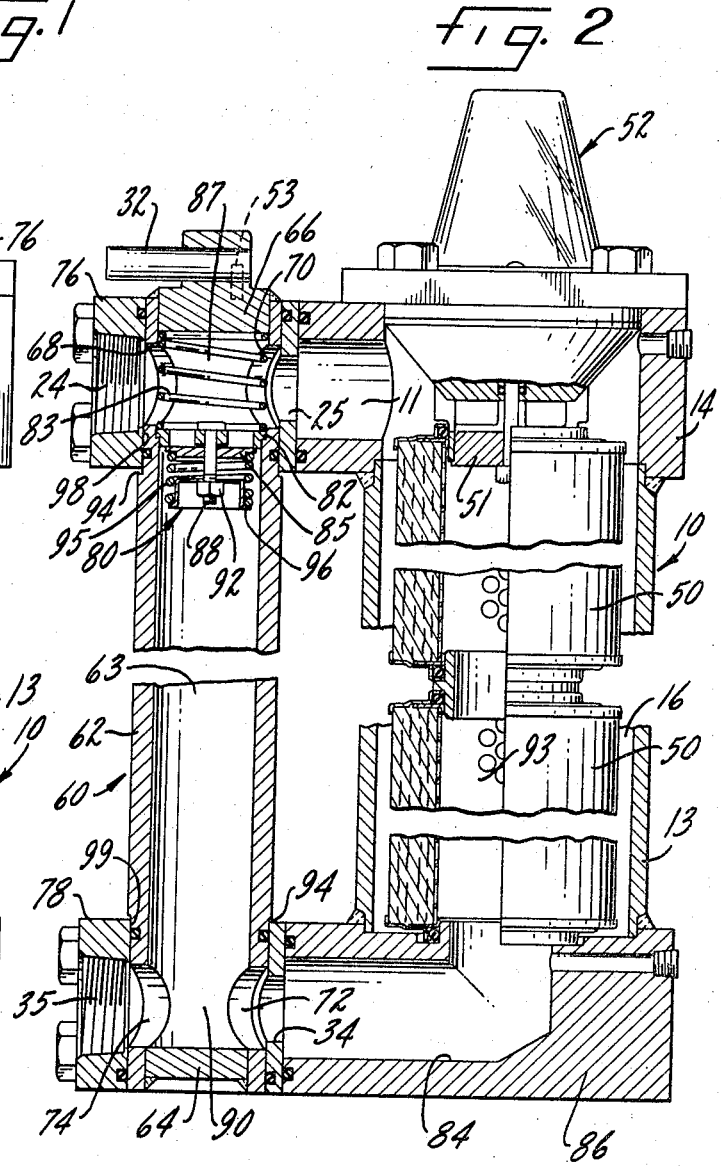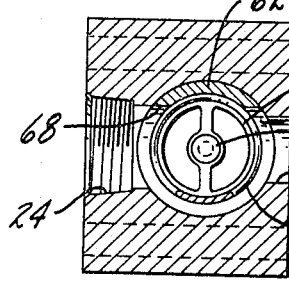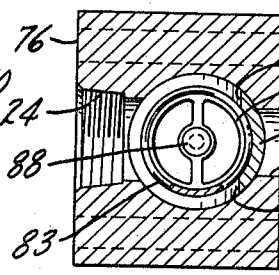

3,341,018
FILTER AND FILTER BY-PASS ASSEMBLY
Walter J. Kudlaty, Elmhurst, Ill., assignor to Marvel Engineering Company, Chicago, Ill., a corporation of Delaware
Filed Aug. 22, 1966, Ser. No. 574,137
8 Claims. (Cl. 210—130)

ABSTRACT OF THE DISCLOSURE

A filter and filter by-pass assembly having a filter housing and a rotatable tube associated therewith which has two longitudinally spaced passages formed in the tube wall to direct fluid into the filter housing when the tube is rotated to a first position and to direct fluid through the tube when the tube is rotated to a second position, thereby by-passing the fluid from the filter housing.

This invention is concerned with a hydraulic fluid filter and filter by-pass system for use on machines which require filtered hydraulic fluid in their operation.

Therefore, one object of this invention is a hydraulic fluid filter and filter by-pass assembly containing automatic and manual means for directing fluid through or around one or more filter elements.

Another object is a fluid filter and filter by-pass assembly containing dual automatic means for by-passing hydraulic fluid from filter elements when such elements become clogged.

Another object is a fluid filter and filter by-pass assembly containing manual means of diverting fluid from clogged filter elements to enable replacement of such filter elements.

Another object is a hydraulic fluid filter and filter by-pass assembly that permits removal and replacement of clogged filter elements without shut-down of the machine in which the hydraulic fluid is circulating.

Another object is a filter and filter by-pass assembly that can be easily and quickly operated between filtering and by-pass positions.

Another object is a by-pass construction for a filter and filter by-pass assembly that requires manipulation of only a single valve to divert fluid from the filter elements.

Another object is a filter and filter by-pass assembly which is compact in construction.

Another object is a filter and filter by-pass assembly having a check valve that can be easily replaced.

Another object is a filter and filter by-pass assembly having a check valve that is positively biased to a closed position.

Another object is a filter and filter by-pass assembly having a by-pass check valve which is adjustable to open automatically at various pressures.

Another object is a filter and filter by-pass assembly having a by-pass check valve that is easily installed and removed.

Another object is a filter and filter by-pass assembly having a by-pass check valve which is self cleaning.

Other objects will be found in the following specification, claims and drawings in which:

FIGURE 1 is an elevational view of the filter and filter by-pass system of the invention;

FIGURE 2 is a cross-sectional view taken along line 2—2 of FIGURE 1;

FIGURE 3 is a cross-sectional view of the by-pass tube valve of FIGURE 2 shown in the filtering position; and FIGURE 4 is a cross-sectional view of the by-pass tube valve of FIGURE 3 shown in the by-pass position.

Referring now to the drawings and particularly to FIGURES 1 and 2, the numeral 10 indicates a tubular filter housing having an inlet passage 11 and an outlet passage 84. The filter housing is formed from a tube 13 which is welded to a head or inlet fitting 14 and a base or outlet fitting 86 with the inlet passage being located in the head and the outlet passage in the base. The tube 13 and fittings 14 and 86 define a chamber 16.

The filter housing tube 13 may be of any convenient length and in this example is shown as having a length sufficient to receive two filter elements 50. The filter housing may also be equipped with a by-pass valve 51 and a by-pass indicator 52. For details of the valve 51 and by-pass indicator 52, reference is made to my co-pending patent application Ser. No. 434,022, filed Feb. 19, 1965.

The numeral 60 indicates a by-pass tube valve assembly which is rotatably mounted by its end portions within fittings 76 and 78. The by-pass tube valve assembly 60 consists of a conduit or tube 62, a bottom plug 64, and a top plug 66 into which a valve handle 32 is inserted. The top and bottom plugs 66 and 64 are welded to the conduit or tube 62 forming a chamber 63. The by-pass tube 62 has a major portion of its circumferential wall removed adjacent each end, as at 68, 70, 72 and 74, forming an intake passage 87 and a discharge passage 90.

A pressure sensitive by-pass check valve assembly 80 is positioned within the by-pass tube 62 and removably retained therein by a spring 83. The by-pass check valve assembly 80 is of such proportions that it is insertable and removable through intake passage 87 of the by-pass tube valve 60. The by-pass check valve assembly consists of a mounting ring 82, a closure member 85, a spring 95, a fastener 88, a spring retaining pan 96, and a lock nut 92. The by-pass check valve assembly 80 may be adjusted using lock nut 92 such that closure member 85 will open when the pressure within passage 87 reaches a predetermined level.

The intake fitting 76 contains an inlet passage 24, a by-pass tube mounting passage 98, and an outlet passage 25 and is positioned so that the outlet passage 25 communicates with the inlet passage 11 of the filter housing inlet fitting 14. The by-pass discharge fitting 78 is formed with an outlet 35, a by-pass tube mounting passage 99, and an inlet passage 34 and is positioned so that the inlet passage 34 communicates with the outlet passage 84 of the filter housing outlet fitting 86.

The by-pass tube valve 60 may be rotated, using handle 32, from a first or filtering position, in which the passage 87 of the by-pass tube valve 60 connects the inlet passage 24 and the outlet passage 25 of the intake fitting 76 and the passage 90 of the by-pass tube valve 60 connects the outlet 35 with the inlet 34 of the by-pass discharge fitting 78, to a second or by-pass position. The first position of the by-pass tube valve 60 is shown in FIGURES 1–3. With the by-pass tube valve 60 and valve handle 32 rotated to the second or by-pass position, there is no communication between the inlet passage 24 and the outlet passage 25 of the intake fitting 76 and there is no communication between the outlet 35 and the inlet 34 of the by-pass discharge fitting 78. The second or by-pass position of the by-pass tube valve 60 is shown in FIGURE 4. With the by-pass tube valve 60 in such second or by-pass position, fluid pressure in the passage 87 of the by-pass tube valve 60 causes the by-pass valve closure member 85 to open allowing fluid to flow from the passage 87, into the chamber 63, through the passage 90, and into the outlet 35 of the by-pass discharge fitting 78.

Stop pins 53 and 54 are provided on the intake fitting 76 to engage the valve handle 32 for positioning the by-pass tube valve 60 in its first or filtering position and second or by-pass position and limiting the movement of such valve within these positions. These pins limit rotation of the by-pass tube valve 60 and valve handle 32 to 90°.

The by-pass tube valve 60 is rotatably attached to the filter and filter by-pass assembly by engagement of the ends of such tube with the intake and discharge fittings 76 and 78. Axial retention of the by-pass tube valve 60 within the intake and discharge fittings 76 and 78 is accomplished by ledges 94.

The use, operation, and function of the invention are as follows:

The filter by-pass assembly of this invention is intended for installation on high speed automatic machine tools used in production line situations. Under such conditions it is highly undesirable to shut down a machine tool to change a clogged filter element. Therefore, it is necessary to provide for continued operation of the machine tool during the changing of the filter elements. The filter elements may be changed at regular intervals or the filter housing may be equipped with pressure drop indicators, as depicted herein, to show when the filter elements should be replaced.

The filter and filter by-pass system of this invention is shown in its filtering position in FIGURES 1–3 wherein the by-pass tube valve assembly 60 is arranged to permit flow from the inlet passage 24 of the intake fitting 76, into the inlet passage 11 of the filter housing inlet fitting 14, through the filter elements 50, into the filter chamber 93, through the outlet passage 84 of the filter housing outlet fitting 86, through the by-pass tube valve passage 90, to the by-pass discharge fitting outlet 35. The spring 95 exerts a force against the by-pass check valve closure member 85 such that the closure member 85 is pressed tightly against the by-pass check valve mounting ring 82 prohibiting flow of fluid from the passage 87 into the chamber 63.

When the filter elements 50 become clogged, fluid pressure develops in the inlet passage 11 of the filter housing inlet fitting. As the pressure differential across the filter elements 50 increases, the by-pass valve 51 starts to open causing the by-pass indicator 52 to indicate the condition of the filter element 50. Whether the by-pass valve 51 fully opens, allowing fluid to flow from the inlet passage 11 of the filter housing inlet fitting 14 into the filter chamber 93 and through the outlet passage 84 of the filter housing outlet fitting 86, depends upon the pressure at which the by-pass check valve assembly 80 is set to open. When fluid pressure in the passage 87 reaches a predetermined level, such pressure forces the by-pass valve closure member 85 against its spring 95, compressing such spring and allowing fluid flow between passage 87 and chamber 63. By tightening or loosening the lock nut 92, the spring 95 can be compressed or extended so that the force exerted upon the by-pass check valve closure member 85 may be varied and thus the pressure to which the by-pass check valve is responsive may be adjusted. Accordingly, the by-pass check valve 80 may be adjusted in relation to the by-pass valve 51 so that both valves are responsive to the same pressure or so that such valves are responsive to different pressures. Thus the by-pass check valve assembly 80 may be adjusted such that when the filter elements 50 become clogged all fluid by-passes the filter housing 10 by passing through the by-pass valve 80 into chamber 63 and through the by-pass discharge fitting outlet 35; or, such valve assembly 80 may be adjusted such that when the filter elements 50 are clogged, both the by-pass valve 51 and the closure member 85 of the by-pass valve assembly 80 open allowing fluid to flow to the by-pass discharge fitting outlet 35 through both the by-pass tube valve chamber 63 and the filter chamber 93; or, the by-pass check valve assembly 80 may be adjusted such that fluid flow, if any, when the filter elements 50 are clogged is through by-pass valve 51.

To replace the filter elements 50 without shutting down the machine to which the filter and filter by-pass assembly is attached and in which the hydraulic fluid is being circulated, the by-pass tube valve 60 is rotated 90° clockwise, as shown in FIGURE 4, using handle 32 such that the handle is against the stop pin 53. With the by-pass tube valve in this by-pass position, depending upon the pressure setting of the by-pass check valve assembly 80, either all fluid flow from the modified discharge fitting outlet 35 is stopped or fluid flows from the inlet passage 24 of the intake fitting 76, through the by-pass check valve assembly 80 and chamber 63, and into the by-pass discharge fitting outlet 35. With the by-pass tube valve 60 in this by-pass position, all fluid flow through the filter housing 10 is stopped.

The design of the by-pass check valve assembly 80 is such that said valve may be easily inserted or removed through the intake passage 87 of the by-pass tube valve 60. The by-pass check valve assembly 80 is so designed and positioned within the by-pass tube valve 60 that all sediment and contaminants which might interfere with the proper operation of the closure member 85 are washed away by fluid flowing through passage 87.

The filter and filter by-pass assembly disclosed herein provides a filtering system which is compact, economically produced, easily installed, and easily maintained. When the filter elements become clogged, the hydraulic fluid automatically by-passes such clogged filter elements to allow continued operation of the machine to which the invention is attached while providing a visual indication that the filter elements need replacement. The invention then facilitates replacement of the clogged filter elements while allowing continued operation of the machine to which the invention is attached.

The check valves have been so designed and positioned within the invention that they are easily replaced and are not susceptible to clogging. For example, the by-pass check valve assembly 80 has been positioned at the upper end of the by-pass tube valve 60 to prevent a buildup of sediment in such by-pass tube valve and to provide self-cleaning action to the by-pass check valve assembly.

While the preferred form of the invention has been described, it should be understood that suitable other additions, alterations and variations may be made without departing from the invention's fundamental theme.

I claim:
1. A filter and filter by-pass assembly including:
   a filter housing having a chamber adapted to contain at least one filter element,
   an inlet fitting and an outlet fitting connected to said chamber,
   an inlet passage and an outlet passage for said chamber formed, respectively, in said inlet and said outlet fittings,
   an intake fitting adapted to connect to said chamber inlet fitting,
   said intake fitting having an inlet, an outlet, and a by-pass tube mounting passage with said outlet communicating with said chamber inlet passage,
   a by-pass discharge fitting connected to said chamber outlet fitting,
   said by-pass discharge fitting having an inlet, an outlet, and a by-pass tube mounting passage with said inlet communicating with said chamber housing outlet passage,
   a by-pass tube valve connecting said by-pass tube mounting passages of said intake fitting and said by-pass discharge fitting,
   with said by-pass tube valve having two positions, the first position connecting said inlet and outlet of said intake fitting and said inlet and outlet of said discharge fitting and the second position connecting said inlet of said intake fitting with said outlet of said by-pass discharge fitting, and
   a by-pass check valve assembly removably insertable in said by-pass tube valve to prevent flow into said intake fitting from said by-pass discharge fitting and to allow flow from said intake fitting to said by-pass discharge fitting.

2. The structure of claim 1 further characterized in that a spring urges said by-pass check valve toward its closed position and means for adjusting said spring so that the pressure at which said by-pass check valve opens is adjustable.

3. The structure of claim 1 further characterized in that said by-pass check valve assembly is positioned within and at the upper end of said by-pass tube valve so that said check valve is near the flow of fluid thereby making such check valve self-cleaning.

4. In a fluid filter assembly of the type having filtering means and filter by-pass means connected in parallel with said filtering means, with said filter by-pass means comprising a tube having two longitudinally spaced passages through the tube wall and a pressure-responsive check valve positioned within said tube between said passages, said tube being closed beyond said passages, supporting structure rotatably mounting said tube and enabling tube rotation between a first position which directs fluid through said filter means and a second position which directs fluid through said tube, thereby by-passing fluid from said filter means.

5. The structure of claim 3 further characterized in that a spring urges said check valve toward its closed position and means for adjusting said spring so that the pressure at which said valve opens is adjustable.

6. The structure of claim 4 further characterized in that said check valve is positioned within and at the upper end of said tube so that said valve is near the flow of fluid thereby making such valve self-cleaning.

7. A fluid filter and filter by-pass assembly including:
a filter housing,
at least one filter element in said housing,
manual conduit valve means associated with said housing and rotatable between a first and second position,
a first pressure-responsive valve engaging said filter element in position to affect the flow of fluid within said housing,
a second pressure-responsive valve positioned inside of and adjacent an end of said manual conduit valve means,
with said manual conduit valve means comprising a tube having two longitudinally spaced ports formed in the walls thereof to direct fluid into said housing when said manual conduit valve means is in said first position and into said tube means when said manual conduit valve means is in said second position, thereby by-passing said fluid from said housing.

8. The structure of claim 7 further characterized in that said second pressure-responsive valve is positioned within and at the upper end of said by-pass conduit.

References Cited

UNITED STATES PATENTS

| | | | |
|---|---|---|---|
| 511,798 | 1/1894 | Rankine | 210—130 |
| 1,172,728 | 2/1916 | Perkins | 210—422 X |
| 1,861,805 | 7/1932 | Lentz | 210—130 X |
| 2,070,395 | 2/1937 | Easter | 210—340 X |
| 3,229,816 | 1/1966 | Rosaen | 210—130 |

REUBEN FRIEDMAN, *Primary Examiner.*

F. SPEAR, *Assistant Examiner.*